United States Patent [19]

Zimmermann et al.

[11] Patent Number: 5,189,299

[45] Date of Patent: Feb. 23, 1993

[54] METHOD AND APPARATUS FOR SENSING STRAIN IN A WAVEGUIDE

[75] Inventors: Bernd D. Zimmermann, Blacksburg; Richard O. Claus, Christiansburg; Kent A. Murphy, Roanoke; David A. Kapp, Blacksburg, all of Va.

[73] Assignees: Virginia Polytechnic Institute & State University; Virginia Tech Intellectual Properties, Inc., both of Blacksburg; Center for Innovative Technology, Herndon, all of Va.

[21] Appl. No.: 526,593

[22] Filed: May 22, 1990

Related U.S. Application Data

[63] Continuation-in-part of Ser. No. 210,890, Jun. 20, 1988, Pat. No. 4,928,004.

[51] Int. Cl.$^5$ .................... H01J 5/16; G01N 21/00
[52] U.S. Cl. .................... 250/227.16; 356/73.1
[58] Field of Search .................. 250/227.14, 227.15, 250/227.16, 231.1, 231.19; 356/73.1; 73/800; 385/12, 13

[56] References Cited

U.S. PATENT DOCUMENTS

| | | | |
|---|---|---|---|
| 4,173,412 | 11/1979 | Ramsey et al. | 356/73.1 |
| 4,725,728 | 2/1988 | Brininstool et al. | 250/227.14 |
| 4,787,741 | 11/1988 | Udd et al. | 356/345 |
| 4,899,043 | 2/1990 | Mochizuki et al. | 356/73.1 |
| 4,950,883 | 8/1990 | Glenn | 250/227.14 |
| 5,045,689 | 9/1991 | Frochly et al. | 250/227.15 |

FOREIGN PATENT DOCUMENTS

| | | | |
|---|---|---|---|
| 0125037 | 7/1984 | Japan | 356/73.1 |
| 0173129 | 8/1986 | Japan | 356/73.1 |
| 0191935 | 8/1986 | Japan | 356/73.1 |
| 2165118A | 4/1986 | United Kingdom | 356/73.1 |
| 2190262A | 11/1987 | United Kingdom | 356/73.1 |
| 1560124 | 1/1989 | United Kingdom | 356/73.1 |

OTHER PUBLICATIONS

Barnoski, et al., "Optical Time Domain Reflectometer", Applied Optics vol. 16, No. 9, Sep. 1977, pp. 2375-2379.

Primary Examiner—David C. Nelms
Assistant Examiner—Michael Messinger
Attorney, Agent, or Firm—Kenyon & Kenyon

[57] ABSTRACT

The present invention pertains to a strain sensor. The strain sensor is comprised of an optical wave guide, a device for providing optical pulses to the optical wave guide and a device for sensing localized strain in the optical waveguide. The sensing device determines shifts in arrival times of the optical pulses at the sensing device that correspond to the localized strain. The apparatus includes a light source, a light detector, and a waveguide connecting the source with the detector. The apparatus also includes means for generating light pulses from the source through the waveguide and means for repeatedly propagating at least one of the light pulses in a closed loop. The light source detects arrival times of the light pulses.

30 Claims, 15 Drawing Sheets $L = i \times L_i \ (l_1 = l_2 = \cdots = L_i)$

METHOD AND APPARATUS FOR SENSING STRAIN IN A WAVEGUIDE

This application is a continuation-in-part of U.S. Ser. No. 07/210,890, filed Jun. 20, 1988, now U.S. Pat. No. 4,928,004.

BACKGROUND AND DISCUSSION OF THE INVENTION

Optical fibers are commonly used in sensors. Typically, some form of energy that is desired to be sensed is received by the optical fiber. The energy causes changes in the optical fiber disposition, location, configuration that manifest themselves, for example, as microbends. Light being transmitted through the optical fiber experiences changes in amplitude or phase due to these changes.

Strain sensors have been developed to sense localized strain, that is, the strain present at discrete locations along the optical fiber. This localized strain corresponds to the energy present at a particular location along the fiber. One such strain sensor is described in U.S. Pat. No. 4,459,477 to Asawa et al. (hereinafter Asawa et al.) where optical pulses are transmitted into the optical fiber. Microbend transducers dispersed along the exterior of the optical fiber cause changes in amplitude of the transmitted optical pulses. The change in amplitude experienced by the optical pulses corresponds to the energy present with respect to a microbend transducer in a localized portion of the optical fiber. However, significant problems with the use of microbend transducers in optical fibers are the higher power losses, transient effects and complex apparatus required to measure the strain.

Another patent that relies on discontinuities to measure strain is U.S. Pat. No. 4,653,916 to Henning et al. (hereinafter Henning et al.). Henning et al. and Asawa et al. rely on discontinuities which are produced by external means such as transducers 14 in Asawa et al. This is a relatively complex, burdensome and obtrusive system requiring extensive external apparatus to measure localized strain. Because the discontinuities are largely external, strain at various locations throughout the cross-section of a structure cannot be measured. In the invention disclosed herein, the system of optical fibers and splices can be located throughout the cross-section of a structure to yield an array of strain measurements. This is accomplished without the type of power loss constraints that other sensors have heretofore experienced.

The strain sensor of the invention is comprised of an optical waveguide utilized with a source for providing optical pulses to the waveguide, and a system for sensing localized strain in the optical waveguide. The sensing system measures changes in arrival times of the optical pulses, which shifts correspond to the localized strain. In a preferred embodiment the sensing means includes reflecting a portion of the optical pulses at predetermined positions along the optical waveguide and detecting the shift in arrival times of the reflected optical pulses.

In utilizing the splices and waveguides of the invention, portions of the sensing system embedded can actually be added in the structure to be measured, often without adversely affecting its structural integrity. Furthermore, the efficiency with which the system operates renders it more economical to the user and more amenable for use with various structures.

The above is a brief description of the deficiencies of the prior art and advantages of the invention. Other advantages will be apparent from the Detailed Description of the Preferred Embodiment which follows.

DESCRIPTION OF THE PREFERRED EMBODIMENT

Figure 1:
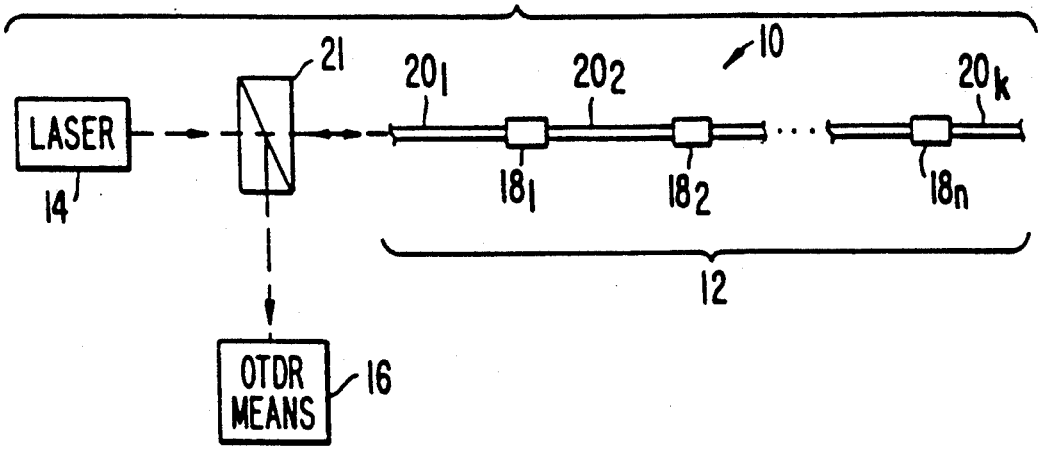
FIG. 1 is a schematic representation of a localized strain sensor.

Referring now to the drawings, wherein like reference numerals designate identical and corresponding parts throughout the several views, and more particularly to FIG. 1 thereof, there is shown a strain sensor 10 which includes optical waveguide 12. Strain sensor 10 is also comprised of means 14 for generating optical pulses to the optical waveguide 10. Preferably, the pulse generating means is a laser, but other types of optical pulse generators may be employed. Additionally, the strain sensor 10 is comprised of means for sensing localized strain in the optical waveguide 10. This system measures the time delay of optical pulses from various positions along the waveguide. Changes in the time delay are a function of strain at a particular location. By correlating the change in time delay, with length or certain fiber dimensions, one can arrive at a strain measurement.

The sensing apparatus preferably includes means for reflecting a portion of the optical pulses at predetermined positions in optical waveguide 12 and detecting the shift in arrival times of the reflected optical pulses. Such a system is referred to herein as optical time domain reflectometry (OTDR) means 16.

The reflecting means includes a number n of optical splices 18 connected to the optical waveguide 12, where n is an integer and greater than or equal to 1. The optical waveguide 10 includes k optical fibers 20 connected in series by the n optical splices 18, where k is an integer greater than or equal to 1.

Figure 2:
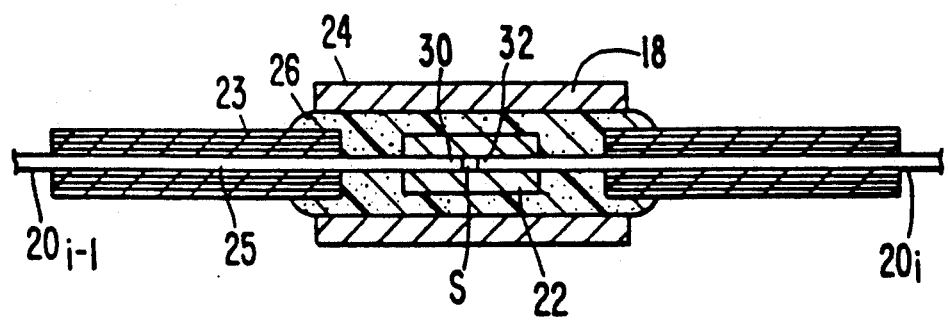
FIG. 2 is a schematic representation of a partially reflective optical fiber splice.

Each splice 18 includes an alignment sleeve 22, as shown in FIG. 2, for receiving two optical fibers 20 and aligning them such that a portion of an optical pulse passes therebetween and a portion of the optical pulse is reflected. As can be seen from FIG. 2, splice 18 permits two waveguides, in this case optical fibers, to be arranged in colinear relationship with their ends 30, 32 slightly spaced by gaps. This arrangement effects a reflection of a portion of an optical pulse while transmitting the remaining portion through the interface of the fibers.

Preferably, each optical fiber 20 has a portion of its optical fiber coating 23 removed so only the optical fiber core and cladding 25 of the optical fiber 20 is received by alignment sleeve 22. Each splice 18 also includes an encapsulating strain relief tube 24 which houses alignment sleeve 22. Epoxy 26 is applied to a portion of exterior surface 23 which couples the two optical fibers 20 to the encapsulating strain relief tube 24. With this configuration the fibers will be fixed relative to each other so that the air gaps do not change. Otherwise false readings may occur as a result of a change in the gap dimension. The epoxy 26 and the alignment sleeve 22 are made out of materials which are compatible and adhere well to each other. In this embodiment the epoxy that meets these requirements are Tracon Tra-Bond BA-F113SC or Epotek 354. The material for the alignment sleeve is Sylgard 184 or silica glass. Other materials may be used so long as they achieve the characteristics noted above.

Encapsulating strain relief tube 24 is impervious to most substantial external forces. Consequently, losses are minimized or eliminated. In this instance encapsulating tube 24 is a stainless steel tube; however, other dielectric material can be used as well. With this configuration essentially a constant percentage of each optical pulse is reflected as it passes through the encapsulating strain relief tube 24 regardless of the conditions external to the encapsulating strain relief tube 24.

In this preferred embodiment the splice is configured to have size which makes it amenable to be embedded in most structures where it is needed to measure strain, particularly in those instances where a number of positions throughout the structure should be measured. As shown in FIG. 2, tube 24 is a right circular cylinder with a diameter of about 1.2 mm and a length of about 1.9 cm. Alignment sleeve 22 has a length of about 0.6 cm and a diameter which is the same as the fiber coating or about 0.5 mm. The remaining volume within tube 24 is filled with epoxy 26.

With this configuration a number of optical fibers can be joined by splices 18 in a colinear relationship to form a strain sensor string 12. A number of sensor strings 12 can be arranged in parallel planes and other positions throughout the structure. As a result, a number of positions corresponding to the location of the splices are available for measuring the strain on the structure due to subjected load.

In the operation of the invention, an optical pulse from a laser is launched into optical fiber $20_1$. The optical pulse travels down the optical fiber $20_1$ until it reaches the first splice $18_1$. A certain percentage of the optical pulse is then reflected back toward the launching end of the optical fiber 20, while the unreflected portion of the pulse continues into optical fiber $20_2$.

The portion of the optical pulse reflected by the first splice $18_1$ emerges from the launching end of optical fiber $20_1$ and is directed by beam splitter 21 which in turn reflects a portion of the beam to OTDR means 16. For a more complete discussion of optical time domain reflectometry (OTDR), see U.S. Pat. No. 4,653,916 issued in Mar. 31, 1987, naming Henning et al. as inventors which patent is incorporated therein by reference. The OTDR means 16 determines the difference in time it takes the optical pulse to travel from the laser to the first splice $18_1$, where a portion of it is reflected, and for the reflected portion to travel back to the OTDR means 16, as compared to the time it takes an optical pulse to travel the same path when there is a known strain present in the optical fiber $20_1$. This difference in time corresponds to the unknown localized strain relative to the known localized strain, and is essentially the result of the different length that the optical pulse must travel due to the localized strain varying the length of the optical fiber $20_1$. Preferably, the known strain that the unknown strain is compared against is zero.

The portion of the optical pulse that is not reflected by the first splice $18_1$ continues to optical fiber $20_2$ until it reaches the second splice $18_2$. At the second splice $18_2$ the optical pulse again has a portion reflected back towards the launching end of optical fiber $20_1$, and an unreflected portion that continues through the second splice $18_2$ into optical fiber $20_3$ which is downstream of splice $18_2$.

The reflected portion of the optical pulse from splice $18_2$ returns through splice $18_1$, and optical fiber $20_1$ to the beam splitter 21 where it is directed to be received by the OTDR means 16. The OTDR means 16, for example, compares the time $T_1$ it takes the optical pulse to travel to the OTDR means 16 via a portion of the optical pulse being reflected by the first splice $18_1$, from the time $T_2$ it takes the optical pulse to travel to the OTDR means 16 via a portion of the optical pulse being reflected by the second splice $18_2$. The difference in these times ($T_2 - T_1$) is the time it takes the optical pulse to travel from the first splice $18_1$ to the second splice $18_2$ and back to the first splice $18_1$. By subtracting the time $T_2$ from the time $T_1$ localized strain effects on the optical fiber $20_1$ are removed from consideration in the determination of localized strain with respect to optical fiber $20_2$. In other words, the determination of localized strain on optical fiber $20_2$ does not include the effects of localized strain on optical fiber $20_1$. The difference in time $(T_2-T_1)$ is then compared to the time corresponding to an optical pulse traveling the same path but associated with a known localized strain with respect to optical fiber $20_2$. The difference in the time $T_2-T_1$ and the known time corresponds to the localized strain with respect to optical fiber $20_2$ relative to a known strain with respect to optical fiber $20_2$. As mentioned above, preferably the known strain is zero, so the localized strain is the actual strain with respect to optical fiber $20_2$. The difference in the time $T_2-T_1$ of the known time corresponds to the difference in length of optical fiber $20_2$ with respect to the localized strain relative to a known localized strain.

The above description of the operation concerning splices $18_1$ and $18_2$ and strain and optical fibers $20_1$ and $20_2$ is applicable for each splice 18 downstream from splice $18_2$ and each optical fiber 20 downstream from optical fiber $20_2$. In general, the time $T_{i-1}$ it takes an optical pulse to travel from the laser to a splice $18_{i-1}$ and from the splice $18_{i-1}$, upon reflection, to the OTDR means 16 is subtracted from the time $T_i$ it takes the optical pulse to travel from the laser to the optical splice $18_i$ and from the splice $18_i$, upon reflection, to the OTDR means 16. In each case the difference in time $T_i\text{-}T_{i-1}$ corresponds to the time it takes an optical pulse to travel from a splice $18_{i-1}$ to a splice $18_i$ and back to splice $18_{i-1}$ via optical fiber $20_i$. This time $T_i\text{-}T_{i-1}$ is then compared to the time it takes an optical pulse to travel from a splice $18_{i-1}$ to a splice $18_i$ and then back to a splice $18_{i-1}$ subject to a known localized strain on the optical fiber $20_i$ optically connecting splice $18_{i-1}$ and splice $18_i$. The times associated with the known strain about optical fiber $20_i$ and the unknown strain about $20_i$ are compared and the difference therebetween corresponds to the localized strain relative to the non-localized strain in an optical fiber $20_i$.

Figure 3:
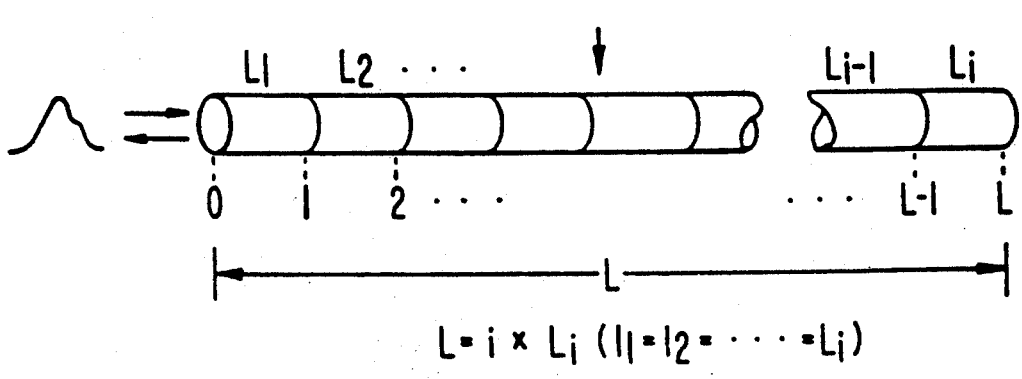
FIG. 3 is a schematic representation of an optical waveguide divided into discrete sections.

The relationship of time, length and strain with respect to an optical fiber 20 is now more fully described. To facilitate understanding of these relationships, and referring to FIG. 3 which schematically represents the optical waveguide 12 comprised of optical fibers 20 connected in series by splices 18, the optical waveguide 12 is divided into discrete sections $L_1$ through $L_i$. For simplicity, the entire length of the optical waveguide 12 is equal to the number of sections i times the length of each section, where $L_1=L_2=\ldots=L_i$. The length $L_i$ of section i is related to the arrival times $T_{i-1}$ and $T_i$ of its near end 36 and far end 38 reflected pulses at the OTDR means 16 by:

$$L_i = (\tfrac{1}{2})(c/n)(T_i - T_{i-1}), \tag{1}$$

where c is the speed of light and n is the average index of refraction of the fiber core. As the individual optical fiber 20 is strained the length $L_i$ of section i varies by:

$$dL_i = \left(\frac{c}{2}\right)\left(\frac{nd(T_i - T_{i-1}) - (T_i - T_{i-1})dn}{n^2}\right) \tag{2}$$

The strain in the ith section is then given by:

$$E_{f,i} = \frac{dL_i}{L_i} = \frac{d(T_i - T_{i-1})}{(T_i - T_{i-1})} - \frac{dn}{n} \tag{3}$$

that Equation (3) takes into consideration the change in refractive index of the fiber core 25 as strain is applied.

Since n varies linearly with strain, Equation (3) can be rewritten as:

$$E_{f,i} = \left(\frac{\Delta T_i - \Delta T_{i-1}}{T_i - T_{i-1}}\right)\left(\frac{1}{1+a}\right) \tag{4}$$

In Equation (4) a denotes the slope of the n vs. $E_f$ curve. G. W. Scherer "Stress Induced Index Profile Distribution and Optical Waveguides", Appl. Opt., Vol. 19, No. 12, 1980, pp. 2006; and C. D. Butter, G. B. Hocker, "Fiber Optic Strain Gage", Appl. Opt., No. 19, 1978, pp. 2067-2069 give expressions for a, however, it is preferable to determine a experimentally for the particular type of optical fiber used in order to ensure accuracy. Also, note the delta notation used in Equation (4) to represent changes in optical pulse arrival times at the OTDR means 16. These delta changes are the quantities which are measured by the sensor 10 to determine the applied strain in section i.

In order to define a power budget which dictates the actual number of splices that can be used for a given dynamic range, the average forward power loss per splice must be calculated. This loss is given by:

$$L_{sp} = 10\log\left[(1-p)\left(\frac{r}{r + S\tan(\sin^{-1}(NA))}\right)^2\right] dB \tag{5}$$

In Equation (5) p denotes the reflection coefficient between the fiber and the gap medium (typically air), and is given by:

$$p = \left(\frac{n-1}{n+1}\right)^2 \tag{6}$$

S is the average gap distance, r is the fiber core radius, and NA is the numerical aperture of the fiber.

The average two-way power loss which determines the power reaching the OTDR means after n splices 18 is given by:

$$L_{2way} = 2nL_{sp} + 10\log(p(1-p))dB \tag{7}$$

Equation (7) allows the determination of the maximum number of splices 18 by equating $L_{2way}$ to the dynamic range of the OTDR means 16. Note that two-way power loss must be considered since optical pulses reflected by splice $18_i$ pass back through splices $18_1$ through $18_{i-1}$ before reaching the OTDR means 16.

The above system is particularly amenable to measuring the strain of a structure at various points throughout the structure cross-section. Because of the size and efficiency of the elements employed, the waveguides and splices can actually be embedded in the structure to be sensed. By using the OTDR method discussed above the strain at a number of locations can be obtained without unnecessarily weakening the structure. Where a multidimensional array of spliced fibers are employed a three dimensional analysis can be obtained.

The above has been a description of an OTDR system which has proven to be satisfactory for measuring a number of parameters. However, this system can be enhanced through the use of methods and apparatus to increase the resolution and, ultimately, the ability to measure more accurately strain or other pertinent parameters such as temperature and pressure. The resolution of fiber strain measurements using optical time domain reflectometry (OTDR) is achieved by incorporating a fiber optic reentrant loop with tap-off or other types of couplers. A repetitive pulse train created by the reentrant loop provides increased resolution in strain measurements due to the fact that successive pulses propagate through the strained fiber region multiple times. For example, pulse number 10 can propagate through the strained fiber region 10 times that of pulse number 1, and hence increases the one way strain resolution by a factor of 10 or an OTDR (2-way) measurement by a factor of five. This improves upon the original design discussed above.

Figure 4:
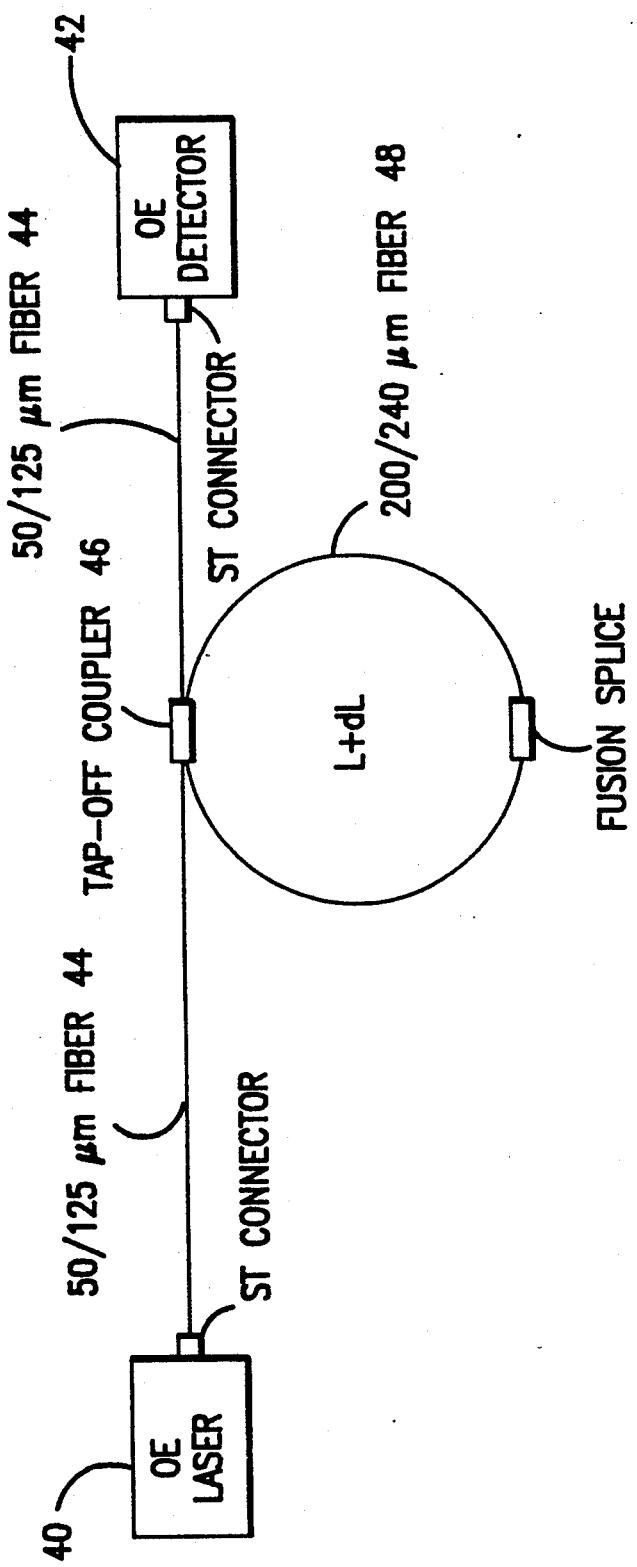
FIG. 4 is a schematic of a fiber optic loop used to generate harmonic pulses.
Figure 5:
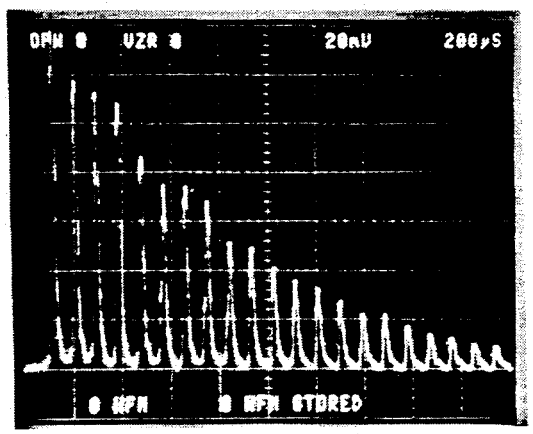
FIG. 5 is a display of harmonic pulses resulting from reentrant loop shown in FIG. 4.

As can be seen in FIG. 4, there is shown a system having laser 40, including an apparatus for generating pulses, and a pulse detector 42 connected by a fiber optic waveguide 44. An asymmetrical tap-off coupler 46 secures re-entrant loop 48 to waveguide 44 at a position intermediate the detector 42 and laser 40. With this system one is able to detect over 100 one-way "harmonic" pulses. This enhances the strain resolution of a given OTDR system by a factor over fifty (depending on the dynamic range). FIG. 5 illustrates the first 45 unaveraged one-way harmonic pulses.

Figure 6:
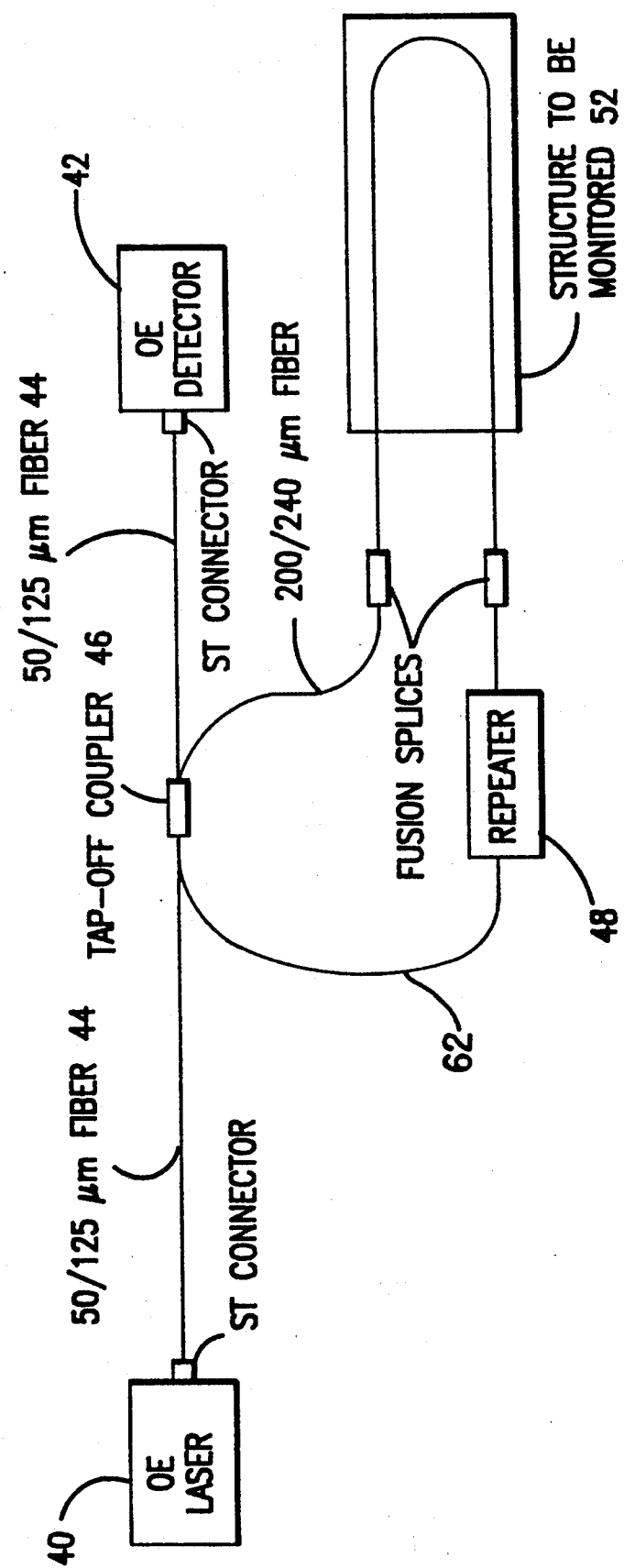
FIG. 6 is another embodiment of a schematic of a reentrant fiber optic loop using a regenerative repeater.

Further improvement involves introducing a regenerative repeater 48 in the measurement loop 62 as shown in FIG. 6. This will increase the resolution of the strain measurements by creating a constant amplitude, "infinite" pulse train through the strained fiber region. As can be seen in FIG. 5, the pulse train created by the loop can degenerate over time. The regenerator 48 which can be a repeater of any type presently used in the marketplace, enhances the pulses to be of substantially constant amplitude such that there is no significant degeneration over time. It should be noted that a portion of loop 62 is shown extended into structure 52 to be sensed.

Figure 7:
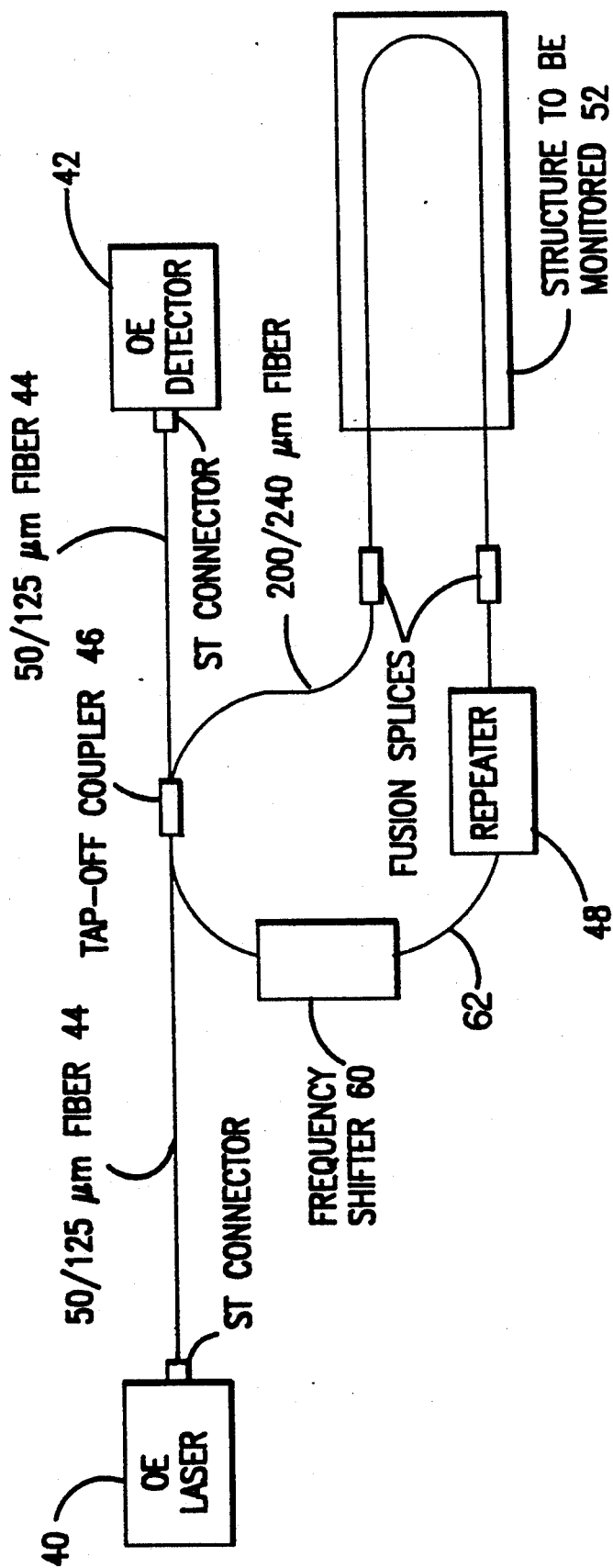
FIG. 7 is a schematic of another embodiment of a fiber optic loop using a regenerative repeater and a frequency shifter.

In the embodiment of FIG. 7, a frequency shifter/modulator 60 is incorporated into loop 62 of the OTDR system. This device permits each successive pulse or pulse train to be frequency shifted from the previous pulses. With a repeater/amplifier 48 included as well, a number of passes are possible without losing the signal in noise. The advantage is that frequency domain multiplexing within the loop will allow improved resolution, quasi-distributed OTDR strain sensing.

Present OTDR systems have a fiber elongation resolution of about 100 micrometers. With the system disclosed herein the resolution may be improved by a factor of 50 (depending on the system dynamic range) without requiring any modification of the OTDR monitor itself. For the most part this can be accomplished with the implementation of commercially available fiber optic components. With the regenerative repeater/amplifier 48 in the measurement loop, the power budget related to coupler excess and tap off loss will be less of a problem. It is expected that state of the art OTDR monitors with fiber elongation resolution of 100 micrometers may in this fashion improve strain measurement resolution below one micrometer. This system can be used in sensing the same type of structures as discussed above, including various elements typically used in the aerospace industry, structural strain monitoring and non-destructive evaluation.

The configuration shown in FIG. 4 eliminates the need for mirrors, mechanical splices and beam splitters which contribute to degradation of power budget. The lowest obtained power loss for passive loops is currently about 0.37 dB, which is the result of coupler excess, coupler tap-off, and fusion splice loss. With the proposed active fiber system, which includes a regenerative repeater, power budget will no longer be a main concern and should present a theoretically endless array of possibilities, including submicron resolution capabilities.

Figure 8:
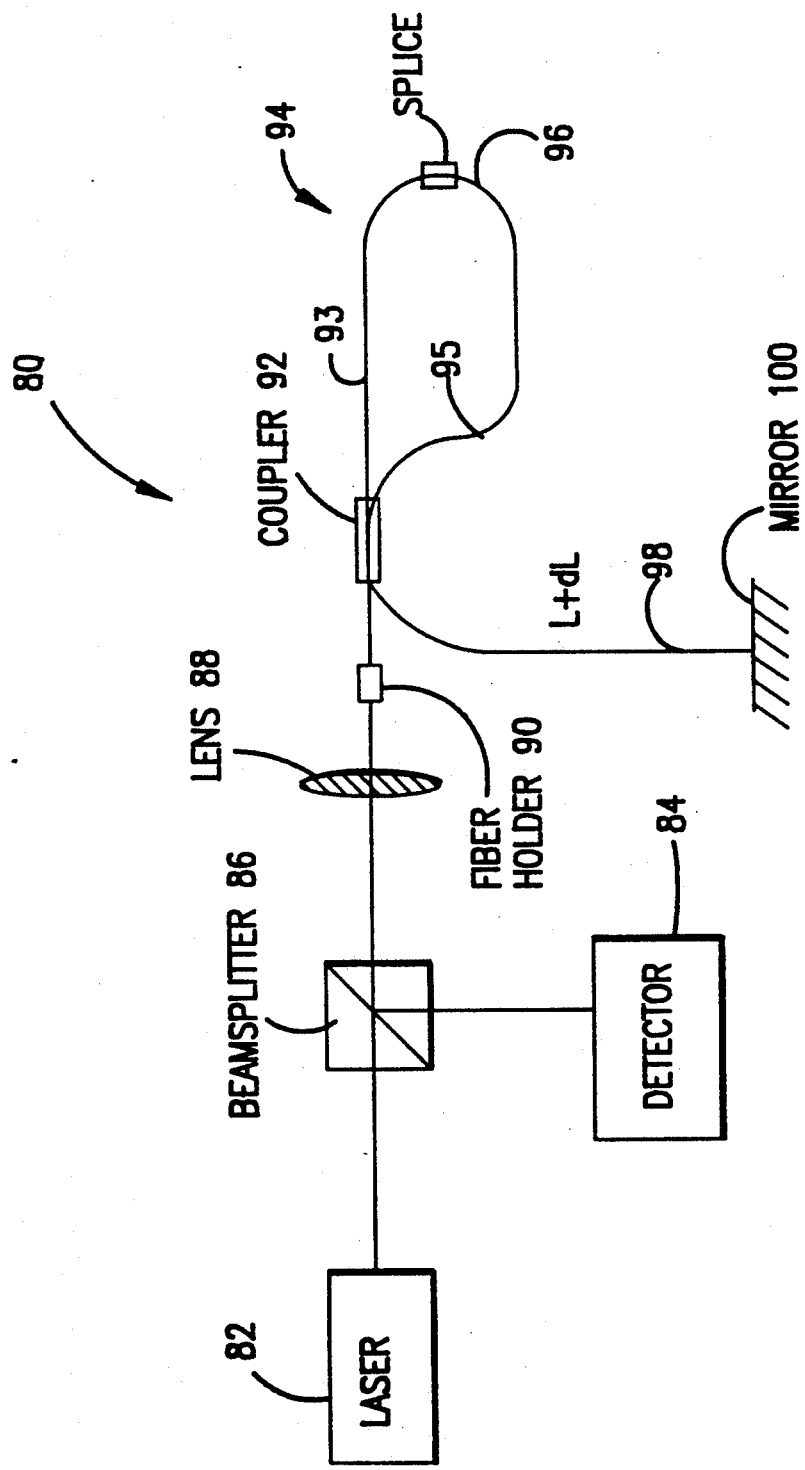
FIG. 8 is a schematic of a fiber optic loop to generate spatial harmonics incorporating a mirror.

Another embodiment as shown in FIG. 8 includes an optical fiber in combination with mirrors, couplers and/or reflective optical power splitting devices. The repetitive launching of optical power into the fiber whose elongation is to be monitored can be achieved in a number of ways using these elements.

Figure 10:
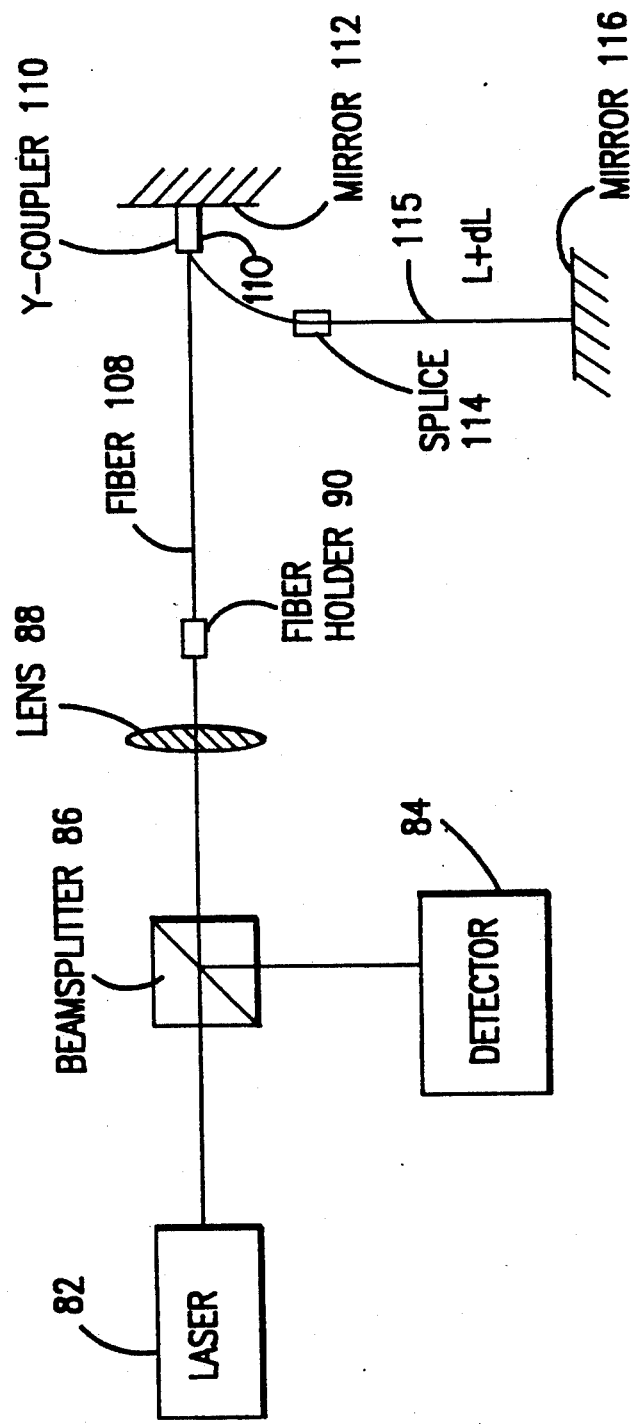
FIG. 10 is a schematic of a fiber optic loop to generate harmonics utilizing two mirrors connected by a separate waveguide.
Figure 11:
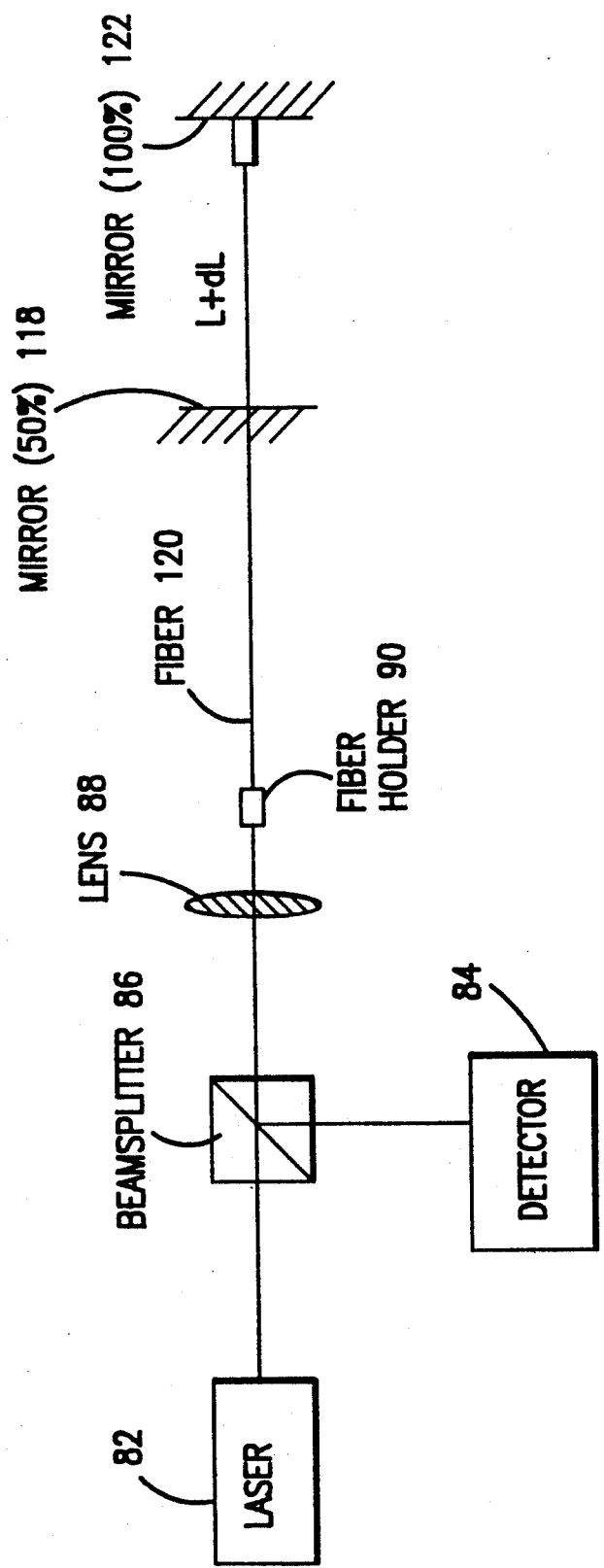
FIG. 11 is a schematic of a fiber optic loop to generate spatial harmonics utilizing two mirrors along the same fiber.
Figure 12:
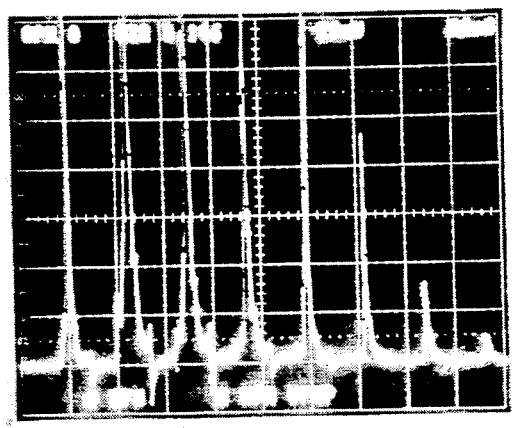
FIG. 12 is a graph of harmonic pulses resulting from the system shown in FIG. 8.
Figure 13:
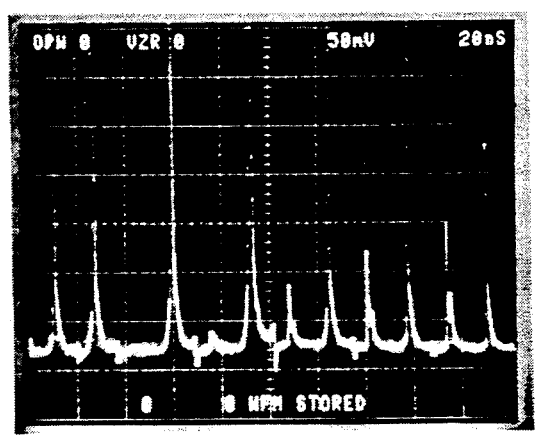
FIG. 13 is a graph of harmonic pulses resulting from the system shown in FIG. 9.
Figure 14:
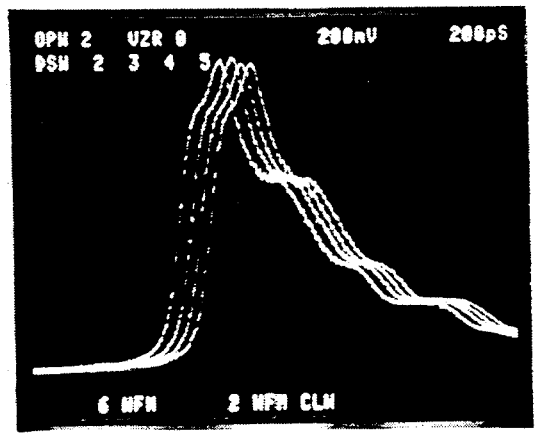
FIG. 14 is a graph of the pulse shift of the first two-way harmonic as the load is increased for the system shown in FIG. 8.
Figure 15:
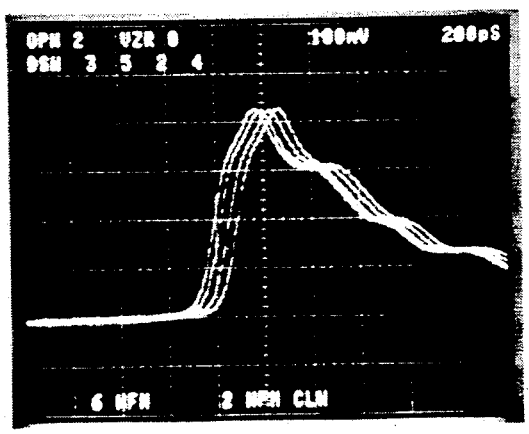
FIG. 15 is a graph of the pulse shift of the first two-way harmonic as the load is increased for the system shown in FIG. 9.
Figure 16:
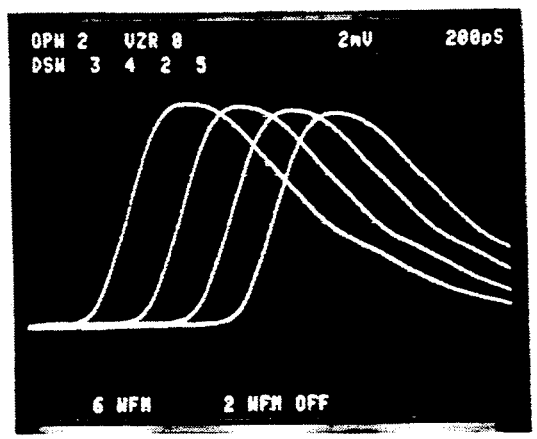
FIG. 16 is a graph of a pulse shift for the fifth two-way harmonic as the load is increased for the system shown in FIG. 8.
Figure 17:
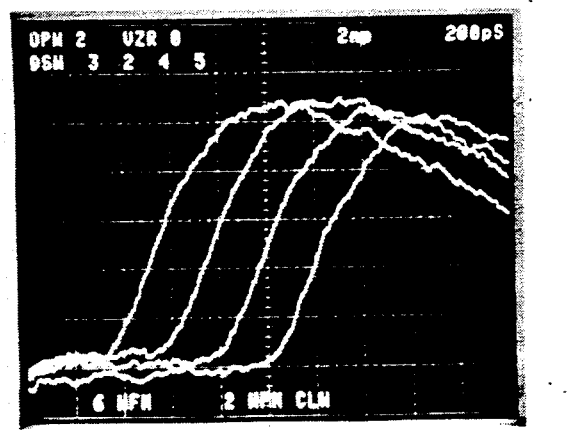
FIG. 17 is a graph of a pulse shift for the sixth two-way harmonic as the load is increased for the system shown in FIG. 9.
Figure 18:
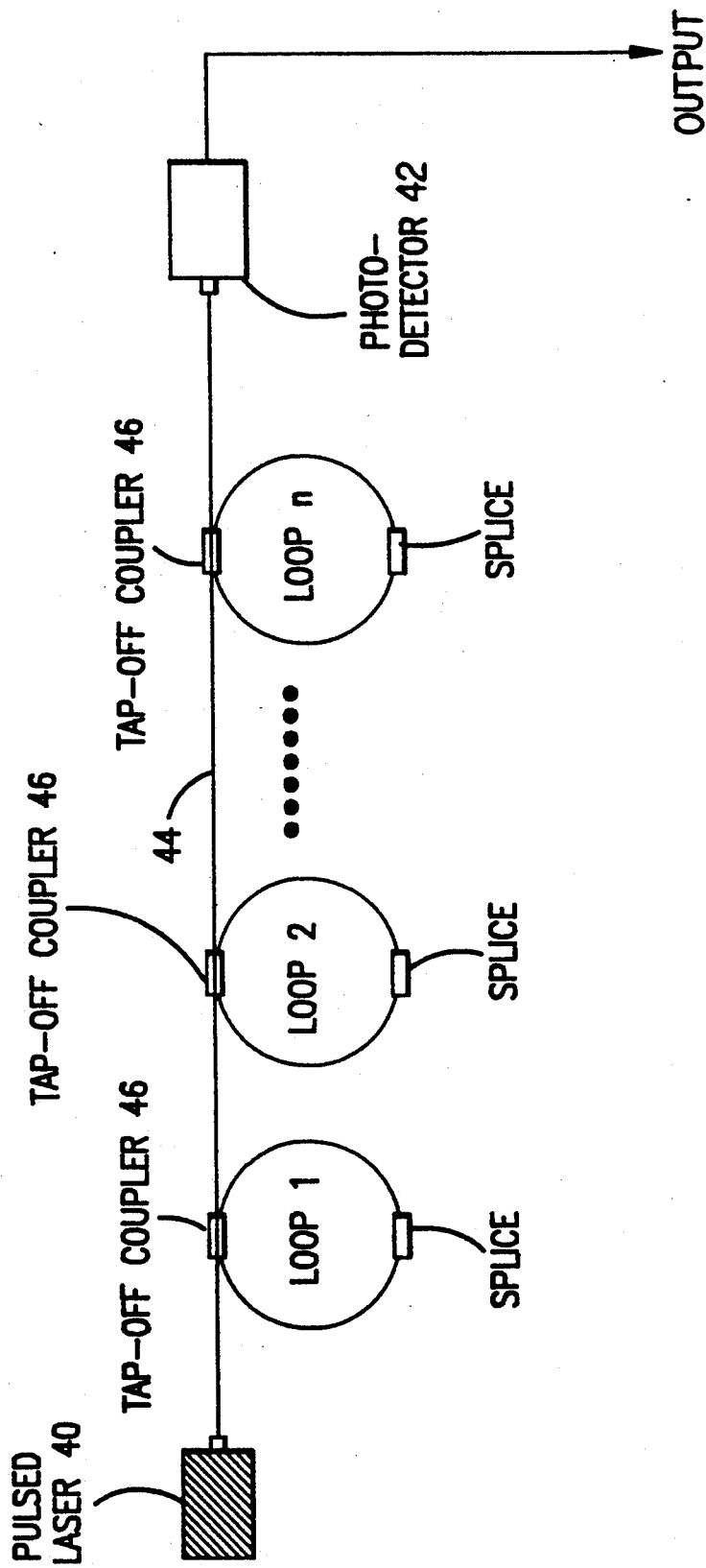
FIG. 18 is a schematic of an embodiment of the invention including a series of in-line fiber optic reentrant loops.

The optical pulse is launched into a fiber system depicted in FIGS. 8 through 11, and will be "trapped" in an infinite fiber loop which results in arrival time "harmonics" as shown in FIGS. 12 and 13. Thus, for an OTDR or time delay monitor with given spatial resolution of X meters, a resolution of X/n meters, n being the number of detectable harmonics is achieved with this system. As can be seen in FIGS. 14 and 15, there is shown the pulse arrival time shifts of the first two way harmonic for two different loop configurations as fiber load is increased from 2N up to 6N. As shown in FIGS. 17 and 18, these shifts are shown for the same amount of fiber load, but for the fifth and sixth two way harmonics, respectively. In each of these cases the amount of pulse shift for a given load has increased by a factor equal to the harmonic number.

The apparatus utilized in some of these other systems is shown, for example, in FIG. 8. Here there is a laser 82 with a beam splitter 86 and light detector 84. Downstream of the beam splitter is a lens 88 connected to a fiber by fiber holder 90. A coupler 92 connects portion 93 of loop 94 to portion 95 to form the loop as shown. These separate fibers that form portions 93 and 95 are connected together by splice 96. Another portion of the fiber 98 extends between the coupler and mirror 100. In this manner some pulses will be fed back through the loop 94 toward the beam splitter and ultimately the detector, while other pulses will be propagated directly to the mirror before being reflected back. In this way harmonics are created for sensing by the detector.

Figure 9:
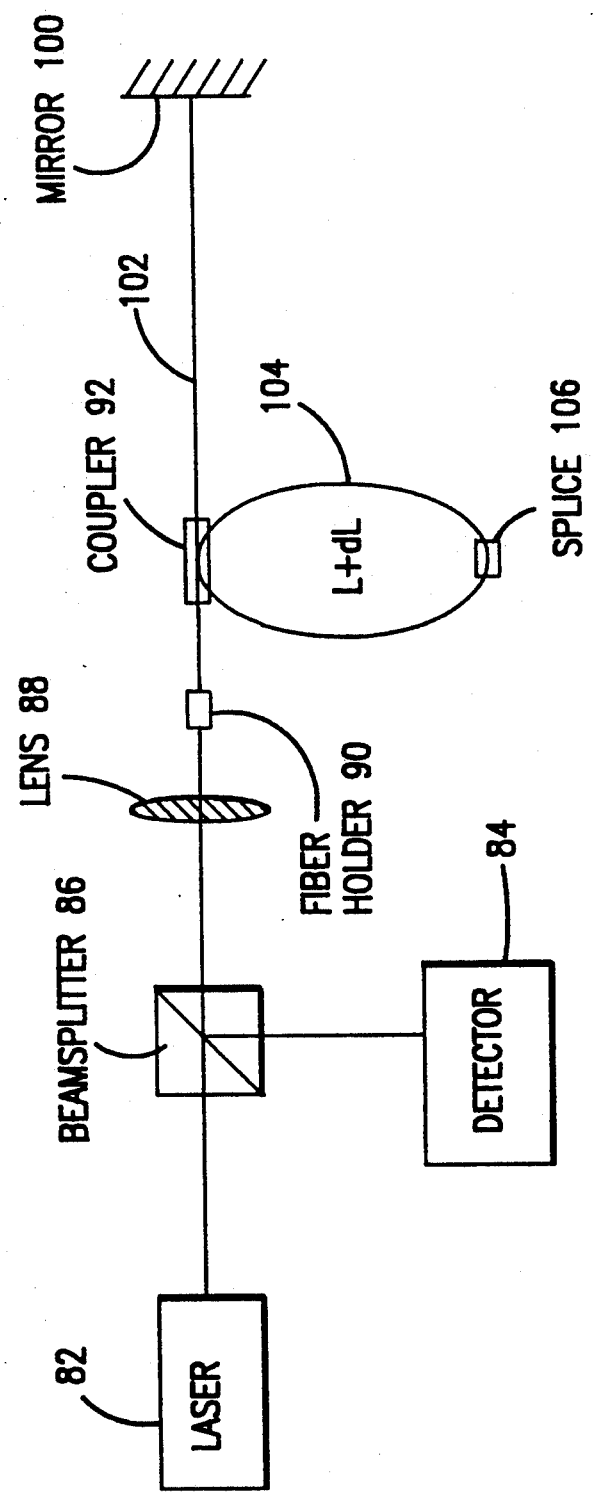
FIG. 9 is another embodiment of the fiber optic loop shown in FIG. 8 with a different mirror and loop arrangement.

In FIG. 9 a similar system is shown, however the manner in which the loop is formed is somewhat different from that as shown in FIG. 8. Rather than having a portion of the loop connected back on itself as shown in FIG. 8, a separate loop 104 is formed. An optical fiber or waveguide 102 is arranged between fiber holder 90 and mirror 100. A coupler 92 is used to couple loop 104 to fiber optic waveguide 102. With this configuration fiber elongation is measured only in the fiber forming loop 104.

These harmonics can be obtained without the use of loops if a dual mirror and coupler system is utilized. As can be seen in FIG. 10, a fiber 108 is connected between the fiber holder 90 and the mirror 112. A coupler 110 connects this fiber at the mirror to another mirror 116 through an optical fiber 115. In this way pulses directed through fiber waveguide 115 to mirror 116 are reflected back to mirror 112, which in turn are reflected with other pulses reflected by mirror 112 along the fiber waveguide 108 toward the lens and ultimately toward the beam splitter 86 and detector 84. Because of the arrangement of mirrors 112 and 116, harmonics can be created in the waveguide 115 connecting these two elements. In this way the resolution is increased.

A somewhat different method is shown in FIG. 11 where a fiber waveguide 120 is connected between the fiber holder 90 and the mirror 122. Intermediate the holder 90 and mirror 122 is a 50% mirror 118. In this way the portion of the waveguide between mirror 118 and 122 will have some pulses repeatedly propagated between these two mirrors in a manner similar to that discussed above with respect to FIG. 10. The observed pulse train characteristics generated by some of these systems are shown in FIGS. 12, 13, 14, 15, 16 and 17.

Figure 19:
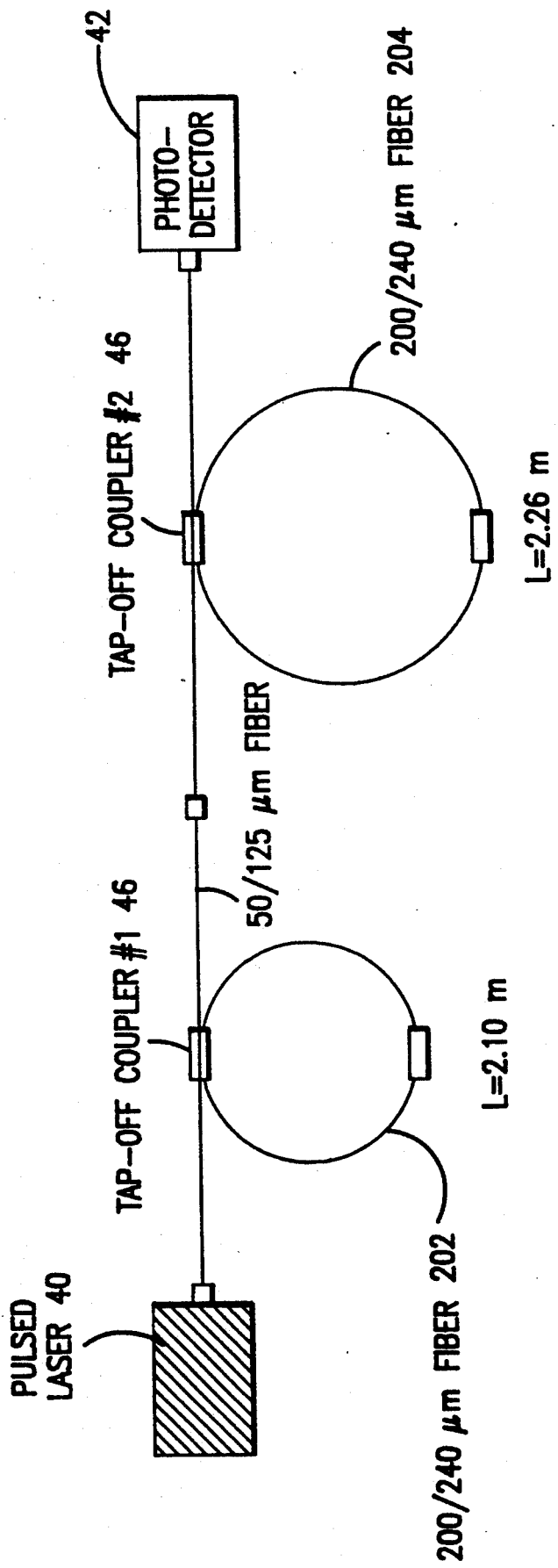
FIG. 19 is a schematic of another embodiment of the invention utilizing a dual in-line reentrant loop system.
Figure 20:
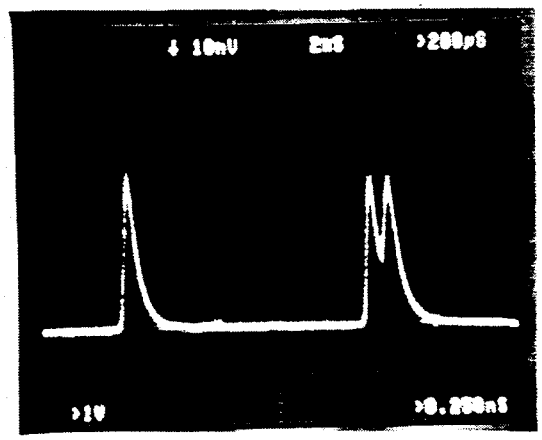
FIG. 20 is a graph of the first two pulse trains resulting from in-line reentrant loops as shown in FIG. 19.
Figure 21:
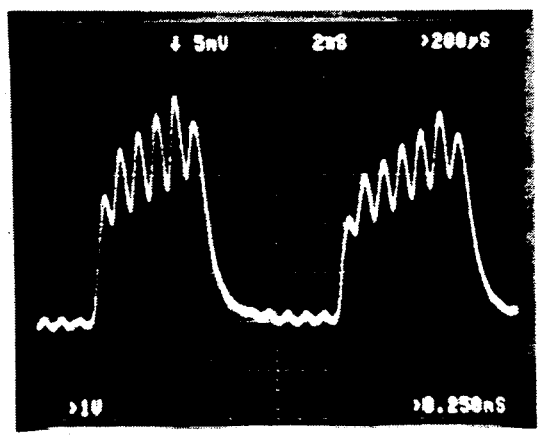
FIG. 21 is a graph of sixth and seventh pulse trains resulting from in-line reentrant loops as shown in FIG. 19.

Another variant of the loop systems discussed above includes a method to perform quasi-distributed strain and/or temperature measurements using in-line fiber optic reentrant loops. The use of such loops for nondistributed sensing applications to improve the measurement resolution of conventional time domain monitors has been discussed above. If such loops are connected in series, as shown in FIG. 18, the parameters such as temperature and strain may be monitored in each loop independent of a protuberance in any other loop. A dual loop system, such as the one shown in FIG. 19, implements fiber optic tap-off couplers with loops 202 and 204. A series of multiplexed pulse trains, as shown in FIGS. 20 and 21, where the first pulses of each train represents the state of the first loop and the last pulse of each train represents the state of the second loop. The pulses between the first and last pulse of each train represent combination of the states of the loops and thus need not be monitored.

Although the invention has been described in detail in the foregoing for the purpose of illustration, it is to be understood that such detail is solely for that purpose and that variation can be made therein by those other than the art without departing from the spirit and scope of the invention as described in the following claims.

What is claimed is:

1. An apparatus for sensing parameters in a waveguide comprising:
   (a) a light source;
   (b) a light detector;
   (c) a waveguide connecting said source with said detector;
   (d) means for generating light pulses from said source through said waveguide; and
   (e) means for propagating at least one of said light pulses in a closed loop a plurality of times, wherein said light detector detects arrival times of said light pulses after propagating in said closed loop a plurality of times.

2. The apparatus according to claim 1 wherein said waveguide includes a first waveguide and a second waveguide, said second waveguide being in the form of said closed loop.

3. The apparatus according to claim 2 wherein said first waveguide extends between said light source and said detector.

4. The apparatus according to claim 3 wherein said second waveguide is coupled to said first waveguide at a position intermediate said light source and said detector.

5. The apparatus according to claim 4 further comprising an asymmetrical tap-off coupler for coupling said first waveguide to said second waveguide.

6. The apparatus according to claim 5 wherein said second waveguide includes a first end and a second end and further comprising a fusion splice for connecting said first end and said second end of said second waveguide together to form said loop.

7. The apparatus according to claim 6 further comprising a repeater, said repeater being integrated into said second waveguide for maintaining a constant amplitude of pulses in said second waveguide.

8. The apparatus according to claim 7 further comprising a frequency shifter to shift successive pulses within said second waveguide.

9. An apparatus for sensing parameters in a waveguide comprising:
   (a) a light source;
   (b) a light detector;
   (c) a waveguide connecting said source with said detector;
   (d) means for generating light pulses from said source through said waveguide at a first frequency;
   (e) a second waveguide in the form of a closed feedback loop for repeatedly propagating at least one of said light pulses in a closed feedback loop, said light detector detecting arrival times of said light pulses after propagating in said closed feedback loop a plurality a plurality of times;
   (f) an asymmetrical tap-off coupler for coupling said feedback loop to said first waveguide at a position intermediate said detector and said light source;
   (g) a repeater for maintaining the amplitude of the pulses in said feedback loop;
   (h) a frequency shifter for shifting the frequency of pulses passing therethrough; and
   (i) said feedback loop, said repeater, said frequency shifter, said first waveguide, said light source, said means for propagating pulses, said detector, and said coupler cooperating to change the frequency of pulses delivered to said detector with substantially constant amplitude and changed frequency.

10. An apparatus for measuring parameters in a waveguide comprising:
   (a) a light source;
   (b) a waveguide;
   (c) means for propagating light pulses through said waveguide;
   (d) means for producing detectable harmonics in said waveguide that includes means for propagating light pulses through a portion of said waveguide a plurality of times; and
   (e) a detector detecting arrival times of said pulses after propagating through said portion of said waveguide a plurality of times.

11. The apparatus according to claim 10 wherein said portion of said waveguide is in the form of a loop.

12. The apparatus according to claim 11 further comprising a mirror for reflecting pulses, a beam splitter for receiving reflected pulses, said detector being arranged to receive pulses from said beam splitter, and said loop being formed between said mirror and said beam splitter.

13. The apparatus according to claim 12 wherein said waveguide includes a first waveguide and a second waveguide, said second waveguide at one end connected to said first waveguide by a splice, at another end connected to said mirror.

14. A method for sensing parameters in a waveguide comprising:
   (a) generating light pulses through said waveguide;
   (b) propagating at least one of said light pulses through a portion of said waveguide a plurality of times; and (c) detecting arrival times of said pulses generated and propagated a plurality of times in said generating and propagating steps.

15. The method according to claim 14 further comprising a first waveguide and a second waveguide, said second waveguide being in the form of said closed loop and said propagating step includes propagating pulses through said loop.

16. The method according to claim 15 wherein said first waveguide extends between said light source and said detector.

17. The method according to claim 16 wherein said second waveguide is coupled to said first waveguide at a position intermediate said light source and said detector and said propagating step includes propagating pulses through said loop prior to transmittal to said detector.

18. The method according to claim 17 further comprising the step of attaching said loop to said first waveguide by an asymmetrical tap-off coupler.

19. The method according to claim 15 wherein said second waveguide includes a first end and a second end and further comprising a fusion splice for connecting said first end and said second end of said second waveguide together to form said loop.

20. The method according to claim 19 further comprising the step of maintaining a constant amplitude of pulses in said second waveguide.

21. The method according to claim 20 further comprising the step of shifting the frequency of successive pulses within said second waveguide.

22. A method for sensing parameters in a waveguide comprising:
(a) arranging a first waveguide between a light source and a light detector;
(b) connecting a closed feedback loop by an asymmetrical tap-off coupler to said first waveguide at a position intermediate said detector and said light source;
(c) generating light pulses from said source through said waveguide at a first frequency;
(d) propagating at least one of said light pulses in a closed feedback loop;
(e) circulating said light pulses in said feedback loop a plurality of times;
(f) maintaining the amplitude of the pulses in said feedback loop;
(g) detecting with said detector arrival times of said light pulses at the first frequency after said light pulses have circulated in said feedback loop a plurality of times; and
(h) shifting the frequency of said pulses passing through said feedback loop.

23. A method for measuring parameters in a waveguide comprising:
(a) connecting a waveguide to a light source;
(b) propagating light pulses through a portion of said waveguide a plurality of times;
(c) producing detectable harmonics in said waveguide; and
(d) detecting arrival times of said pulses, including said harmonics, propagated through said waveguide a plurality of times.

24. The method according to claim 23 further comprising reflecting pulses from said source; splitting said reflected pulses, detecting pulses from said splitting step, and said step of producing harmonics being accomplished between said reflecting step and said splitting step.

25. An apparatus for sensing parameters in a waveguide comprising:
(a) a light source;
(b) a light detector;
(c) a waveguide connecting said source with said detector;
(d) means for generating light pulses from said source through said waveguide; and
(e) means for repeatedly propagating at least one of said light pulses in a first and second closed loop, said light detector detecting arrival times of said light pulses after propagating in said first and second closed loops a plurality of times.

26. The apparatus according to claim 25 wherein said waveguide includes first, second and third waveguides, said second and third waveguides being in the form of said closed loops.

27. The apparatus according to claim 26 wherein said first waveguide extends between said light source and said detector.

28. The apparatus according to claim 27 wherein said second and third waveguides are coupled to said first waveguide at positions intermediate said light source and said detector in series.

29. The apparatus according to claim 26 wherein said loops are connected to said first waveguide for providing a series of multiplexed pulse trains for representing the state of each loop.

30. The apparatus according to claim 6 further comprising at least one optical splice integrated into said second waveguide for reflecting a portion of the optical pulses.

* * * * *

UNITED STATES PATENT AND TRADEMARK OFFICE
CERTIFICATE OF CORRECTION

PATENT NO. : 5,189,299
DATED : February 23, 1993
INVENTOR(S) : Bernd D. Zimmermann et al It is certified that error appears in the above-indentified patent and that said Letters Patent is hereby corrected as shown below:

Column 5, line 67, before "that Equation" insert --Note--.

Column 12, line 19, Change "parameters" to --strain or temperature--.

Signed and Sealed this

Fourth Day of January, 1994

Attest:

BRUCE LEHMAN

*Attesting Officer*　　　*Commissioner of Patents and Trademarks*